United States Patent
Tur et al.

(10) Patent No.: US 10,366,336 B2
(45) Date of Patent: Jul. 30, 2019

(54) METHOD AND APPARATUS FOR EXPLOITING HUMAN FEEDBACK IN AN INTELLIGENT AUTOMATED ASSISTANT

(75) Inventors: Gokhan Tur, Fremont, CA (US); Horacio E. Franco, Menlo Park, CA (US); William S. Mark, San Mateo, CA (US); Norman D. Winarsky, Palo Alto, CA (US); Bart Peintner, Palo Alto, CA (US); Michael J. Wolverton, Mountian View, CA (US); Neil Yorke-Smith, Mountain View, CA (US)

(73) Assignee: SRI International, Menlo Park, CA (US)

( * ) Notice: Subject to any disclaimer, the term of this patent is extended or adjusted under 35 U.S.C. 154(b) by 25 days.

(21) Appl. No.: 13/378,525

(22) PCT Filed: Sep. 1, 2010

(86) PCT No.: PCT/US2010/047584
§ 371 (c)(1),
(2), (4) Date: Mar. 19, 2012

(87) PCT Pub. No.: WO2011/028842
PCT Pub. Date: Mar. 10, 2011

(65) Prior Publication Data
US 2012/0173464 A1    Jul. 5, 2012

Related U.S. Application Data

(60) Provisional application No. 61/275,781, filed on Sep. 2, 2009.

(51) Int. Cl.
G06N 7/00    (2006.01)
G06N 20/00   (2019.01)
(Continued)

(52) U.S. Cl.
CPC ............ *G06N 7/005* (2013.01); *G06F 9/453* (2018.02); *G06N 5/022* (2013.01); *G06N 5/04* (2013.01); *G06N 20/00* (2019.01)

(58) Field of Classification Search
CPC ........ G06N 7/005; G06N 20/00; G06N 5/022; G06N 5/04; G06F 9/453
See application file for complete search history.

(56) References Cited

U.S. PATENT DOCUMENTS

2006/0064431 A1    3/2006  Kishore et al.
2006/0122834 A1*   6/2006  Bennett .............. G10L 15/1822
                                                  704/256
(Continued)

OTHER PUBLICATIONS

Kate Forbes-Riley, Diane Litman, "Designing and evaluating a wizarded uncertainty-adaptive spoken dialogue tutoring system", Computer Speech and Language 25 (2011) pp. 105-126.*

(Continued)

*Primary Examiner* — Eric Nilsson
(74) *Attorney, Agent, or Firm* — Hickman Palermo Becker Bingham LLP (57) ABSTRACT

The present invention relates to a method and apparatus for exploiting human feedback in an intelligent automated assistant. One embodiment of a method for conducting an interaction with a human user includes inferring an intent from data entered by the human user, formulating a response in accordance with the intent, receiving feedback from a human advisor in response to at least one of the inferring and the formulating, wherein the human advisor is a person other than the human user, and adapting at least one model used in at least one of the inferring and the formulating, wherein the adapting is based on the feedback.

24 Claims, 5 Drawing Sheets (51) Int. Cl.
*G06N 5/02* (2006.01)
*G06N 5/04* (2006.01)
*G06F 9/44* (2018.01)
*G06F 9/451* (2018.01)

(56) References Cited

U.S. PATENT DOCUMENTS

| | | | |
|---|---|---|---|
| 2006/0149555 A1* | 7/2006 | Fabbrizio | G10L 15/22 704/275 |
| 2007/0288439 A1 | 12/2007 | Rappaport et al. | |
| 2009/0164431 A1* | 6/2009 | Zivkovic | G06F 17/278 |
| 2009/0204599 A1 | 8/2009 | Morris et al. | |
| 2009/0254539 A1 | 10/2009 | Wen et al. | |
| 2010/0146559 A1 | 6/2010 | Lee et al. | |

OTHER PUBLICATIONS

Cheyer, Julia, Martin, "A Unified Framework for Constructing Multimodal Experiments and Applications", From Cooperaive Multimodal Communication, based on: Second International Conference, CMC'98 Tilburg, the Netherlands, Jan. 1998.*
Di Fabbrizio, Tur, Dilek Hakkani-Tur, "Automated Wizard-of-Oz for Spoken Dialogue Systems", European conference on speech communciation and technology:; Interspeech 9TH, European conference on speech communciation and technology:; 2005, pp. 1857-1860.*
Gupta, Tur, Hakkani-Tur, Bangalore, Riccardi, Gilbert, "The At&T Spoken Language Understanding System", IEEE Transactions on Audio, Speech, and Language Processing, vol. 14, No. 1, Jan. 2006, pp. 213-222.*
Di Fabbrizio, Tur, Hakkani-Tur, Gilbert, Renger, Gibbon, Liu, Shahraray, "Bootstrapping Spoken Dialogue Systems by Exploiting Reusable Libraries", Natural Language Engineering 14 (3), 2007, 313-335.*
Hamid R. Chinaei, Brahim Chaib-draa, Luc Lamontagne, "Learning User Intentions in Spoken Dialogue Systems", In Proceedings of 1st International Conference on Agents and Artificial Intelligence (ICAART'09), Porto, Portugal, Jan. 2009, pp. 1-8.*
Filipe, Mamede, "Indoor Domain Model for Dialogue Systems", from Stephanidis ed., Universal Access in HCI, Part III. HCII 2009, LCNS 5616, Springer-Verlag, Berlin Heilelberg, 2009, pp. 512-520.*
Fogarty, Constructing and Evaluating Sensor-Based Statistical Models of Human Interruptibility, from phD Thesis, published by Carnegie Mellon University, Pittsburg, PA, 2006, pp. 1-154.*
Heather Pon-Barry, Karl Schultz, Elizabeth Owen Bratt, Brady Clark, Stanley Peters, "Responding to Student Uncertainty in Spolken Turtorial Dialogue Systems", International Journal of Artificial Intelligence in Education, vol. 16, Issue 2, Apr. 2006, pp. 171-194.*
Munteanu, Cosmin, and Marian Boldea. "MDWOZ: A Wizard of Oz Environment for Dialog Systems Development." LREC. 2000.*
Cankar, Mihael. "Adapted Wizard-of-Oz Simulation: Studying User." (2006). Helsinki University of Technology. <retrieved from http://www.soberit.hut.fi/T-121/shared/thesis/di-mihael-cankar.pdf>. <retrieved Mar. 12, 2018>.*
Kapoor, Ashish, Winslow Burleson, and Rosalind W. Picard. "Automatic prediction of frustration." International journal of human-computer studies 65.8 (2007): 724-736.*
Gupta, Narendra, et al. "The At&T spoken language understanding system." IEEE Transactions on Audio, Speech, and Language Processing 14.1 (2006): 213-222.*
International Search Report and Written Opinion for PCT/US2010/047584, dated May 18, 2011, consists of 9 unnumbered pages.
International Preliminary Report on Patentability for PCT/US2010/047584, dated Mar. 15, 2012, consists of 6 unnumbered pages.
Cheyer, et al., "A Unified Framework for Constructing Multimodal Experiments and Applications," *Conference on Cooperative Multimodal Communication*, 1998, consists of 7 unnumbered pages.
Supplemental EP Search Report for European Patent Application No. 10814456.9, dated May 19, 2013, pp. 1-4.

* cited by examiner

METHOD AND APPARATUS FOR EXPLOITING HUMAN FEEDBACK IN AN INTELLIGENT AUTOMATED ASSISTANT

CROSS REFERENCE TO RELATED APPLICATIONS

This application claims the benefit of U.S. Provisional Patent Application Ser. No. 61/275,781, filed Sep. 2, 2009, which is herein incorporated by reference in its entirety.

FIELD OF THE INVENTION

The present invention relates generally to intelligent systems, and relates more particularly to techniques by which the behavior of an intelligent system may evolve based on human feedback.

BACKGROUND OF THE DISCLOSURE

Intelligent automated assistant systems that perform functions in response to user requests are common in many contexts. Such systems may be used, for example, in navigation systems and customer service applications. Building a fully automated, intelligent conversational assistant system is nearly impossible using existing methods. Such systems have, however, improved significantly over the last decade due to automated learning methods.

Automated learning methods typically require some kind of feedback (or manually annotated training data) in order for the behavior of the system to evolve. For instance, existing speech recognition and language understanding systems rely on static training data, from which models are trained. Periodically, the static training data is augmented, and the models are either retrained or adapted. New training data can be chosen randomly or using more sophisticated techniques such as active learning, which tries to obtain the most informative samples.

Representative human/machine interaction training data is often obtained from feedback through human correction. When the system makes an error, a human can detect the error and provide the system with a correct response. If this feedback is provided in real time, and the user sees only the corrected output, the configuration of the system is referred to as a "Wizard of Oz" (WOZ) configuration.

SUMMARY OF THE INVENTION

The present invention relates to a method and apparatus for exploiting human feedback in an intelligent automated assistant. One embodiment of a method for conducting an interaction with a human user includes inferring an intent from data entered by the human user, formulating a response in accordance with the intent, receiving feedback from a human advisor in response to at least one of the inferring and the formulating, wherein the human advisor is a person other than the human user, and adapting at least one model used in at least one of the inferring and the formulating, wherein the adapting is based on the feedback.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for exploiting human feedback in an intelligent automated assistant. Embodiments of the invention provide an "organic" intelligent assistant system in which the behavior of the system components evolves in response to feedback received from the user and/or from "wizards." Wizards are given access to the internal decisions that are made by the assistant system, which contribute to the system's final output. This provides the system with more targeted feedback and greatly improves the final output.

Figure 1:
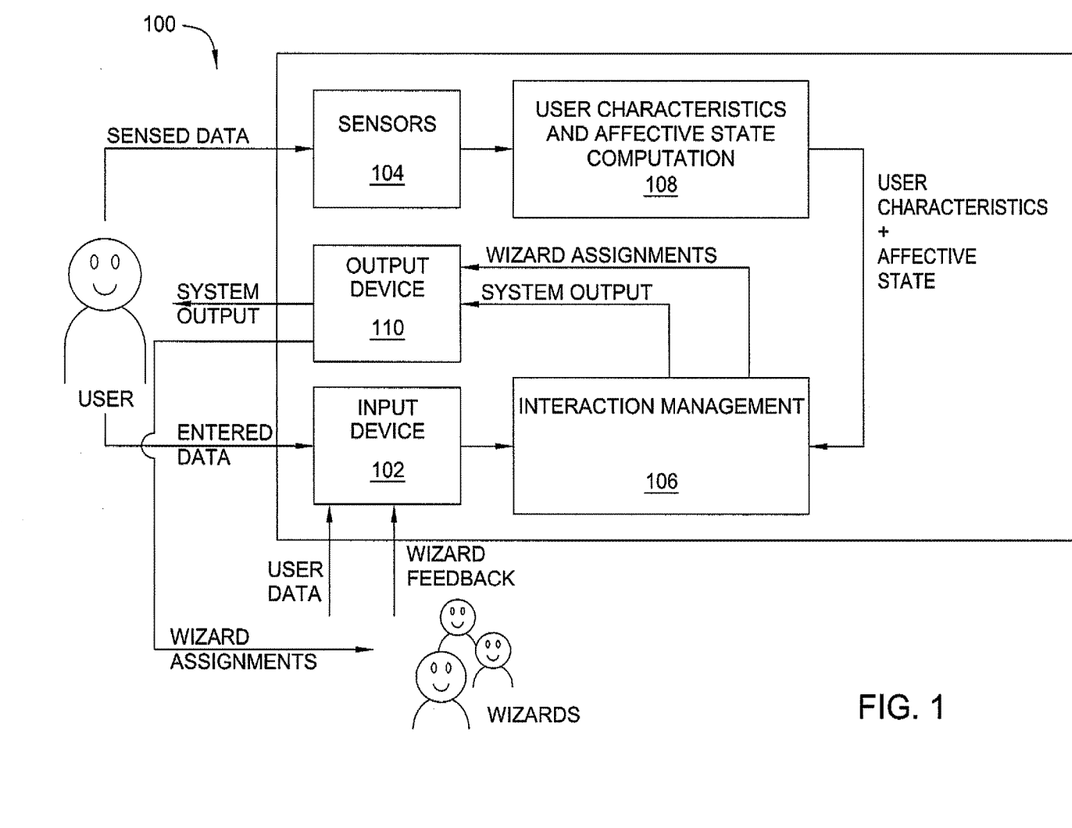
FIG. 1 is a schematic diagram illustrating one embodiment of an intelligent automated assistant system, according to the present invention.

FIG. 1 is a schematic diagram illustrating one embodiment of an intelligent automated assistant system 100, according to the present invention. The system 100 may be incorporated, for example, in a consumer computing device such as a desktop computer, a laptop computer, a cellular telephone, a smart phone, a personal digital assistant, a navigation device, a gaming device, a set top box, or the like. Alternatively, the system 100 may be incorporated in a commercial interactive dialogue system, such as dialogue systems that are used for customer service applications.

As illustrated, the system 100 generally comprises at least one input device 102, a plurality of sensors 104, an interaction management module 106, a user characteristics and affective state computation module 108, and an output device 110.

The input device 102 receives system inputs from a system user, as well as from one or more "wizards." In one embodiment, the input device comprises one or more of the following: a keyboard, a stylus, a mouse, a microphone, a camera, or a network interface (which allows the system 100 to receive input from remote devices).

In one embodiment, the inputs received by the input device 102 are deliberately entered by the user or by the wizards. The inputs received from the user include primary data that is entered by the user, such as requests for assistance (e.g., requests for directions to a specific location, requests for information, or the like). In one embodiment, the inputs received from the user also include the user's feedback with respect to previous system outputs. The inputs received from the wizards include feedback regarding the system's behavior. Wizards are human advisors that correct the behavior of the system 100 by providing feedback with respect to the systems' outputs (e.g., the final system outputs or the outputs of the individual components of the system 100). In addition, the system inputs may include stored user data, such as a user profile.

The sensors 104 receive inputs regarding the user's personal characteristics and/or affective state (e.g., mood). In one embodiment, the sensors include one or more of the following: a microphone, a camera, a pressure sensor, or a temperature sensor.

In one embodiment, the inputs received by the sensors 104 are not deliberately entered by the user. For instance, the inputs received may include secondary data that is tangentially related to the primary data deliberately entered by the user. This secondary data may aid the system 100 in adapting or "personalizing" its outputs to the user. Thus, as discussed above, the secondary data may include personal characteristics about the user (e.g., the user's age, gender, accent, personal appearance, or the like) and/or the user's affective state (e.g., whether the user appears to be in a hurry, irritated, distracted, or the like).

The interaction management module 106 is a processor that is coupled to the input device 102. The interaction management module 106 receives and processes the system inputs collected by the input device 102 in order to formulate a correct system output (e.g., a response to a user request).

The user characteristics and affective state computation module 108 is a processor that is coupled to the sensors 104. The user characteristics and affective state computation module 108 receives and processes the system inputs collected by the sensors 104 in order to produce information related to the user's characteristics and affective state. In one embodiment, the user characteristics and affective state computation module 108 is coupled to the interaction management module 106, and the information related to the user's characteristics and affective state is outputted to the interaction management module. The information related to the user's characteristics and affective state allows the interaction management module 106 to further adapt the system output to the user (e.g., by "personalizing" the system output as discussed above).

The output device 110 is coupled to the interaction management module 106 and outputs the system output to the user. In one embodiment, the output device 110 comprises one or more of the following: a display, a speaker, a haptic device, or a network interface (which allows the system 100 to send outputs to a remote device).

Figure 2:
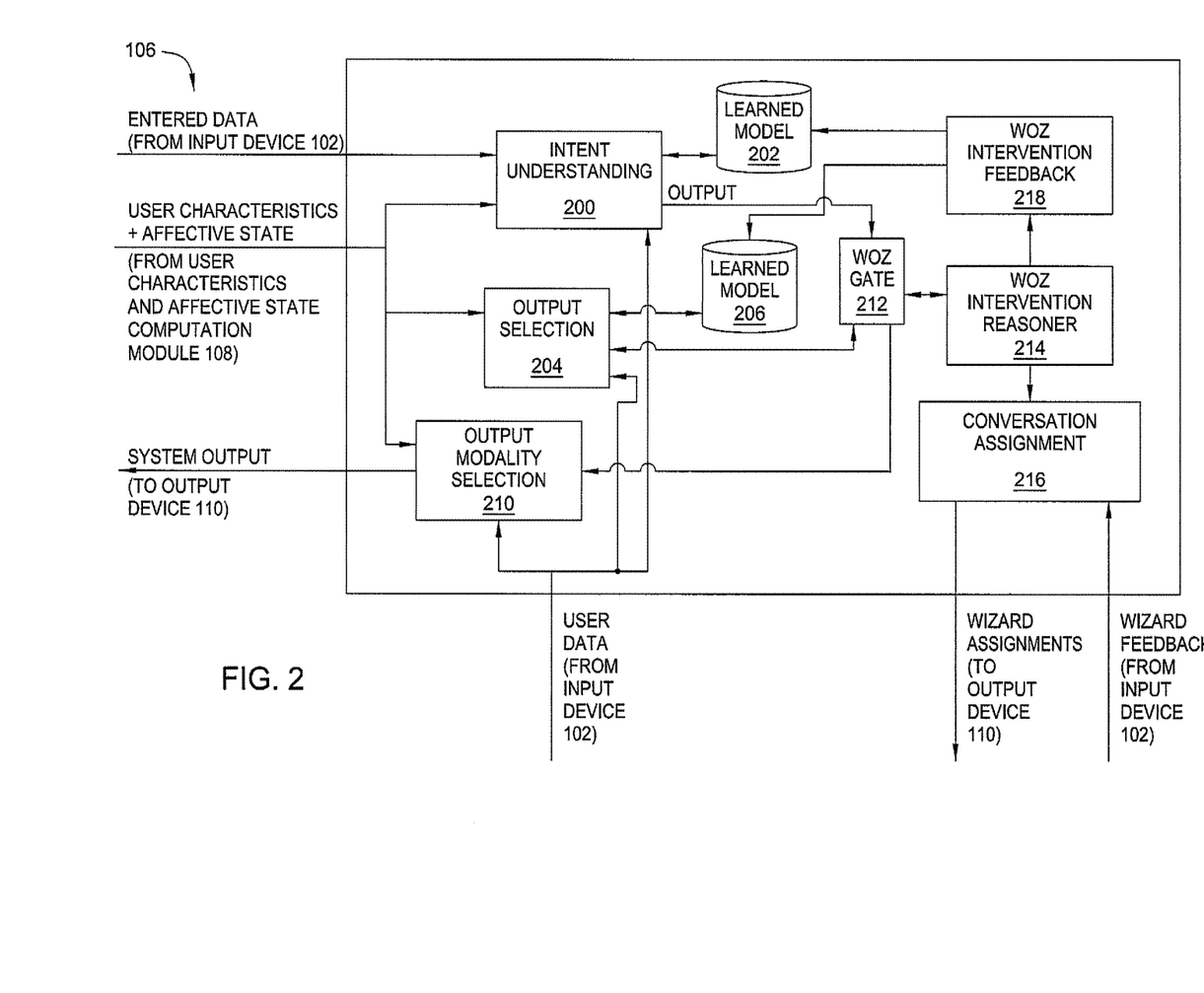
FIG. 2 is a schematic diagram illustrating one embodiment of the interaction management module of FIG. 1 in more detail.

FIG. 2 is a schematic diagram illustrating one embodiment of the interaction management module 106 of FIG. 1 in more detail. As illustrated, the interaction management module 106 generally comprises an intent understanding module 200, a first set of learned models 202, an output selection module 204, a second set of learned models 206, an output modality selection module 210, a Wizard of Oz (WOZ) gate 212, a WOZ intervention reasoner 214, a conversation assignment module 216, and a WOZ intervention feedback module 218.

The intent understanding module 200 is a processor that parses user intent from the entered data provided by the user, the stored user data, and/or user characteristics and affective state (provided by the user characteristics and affective state computation module 108). In other words, the intent understanding module 200 determines what information the user is seeking from the system 100 (e.g., directions to a specific location, an answer to a question, etc.). In one embodiment, the intent understanding module 200 comprises at least one of the following: an automatic speech recognition (ASR) processor, an optical character recognition (OCR) processor, or a natural language understanding (NLU) engine. In one embodiment, the intent understanding module 202 is coupled to the first set of learned models 202, which help the intent understanding module 200 to determine user intent based on learned information.

The output selection module 204 selects the system output based on the system inputs (e.g., the entered data, the sensed data, and the user data) and the information parsed from these inputs (e.g., user characteristics and affective state, user requests, and user preferences). The system output is provided to the WOZ gate 212, as discussed below. This allows the system 100 to determine whether wizard intervention may be required to correct the system output before it is presented to the user. In one embodiment, the output selection module 204 is coupled to the second set of learned models 206, which help the output selection module 204 to determine the appropriate output based on the system inputs and the information parsed from the system inputs.

The output modality selection module 210 is a processor that determines which modality to use to provide the system output to the user. The output modality selection module 210 bases this determination at least in part on the user characteristics and affective state (provided by the user characteristics and affective state computation module 108) and the stored user data. That is, the user's current mood or historical preferences may guide selection of the appropriate output modality. For instance, if the user appears distracted, an audible output modality may be preferable to modality that displays the output. Alternatively, the user's profile may state that the user prefers to receive system output in textual form.

The WOZ gate 212 is an interface that enables the interaction management system 106 to communicate with the wizards. Specifically, the WOZ gate enables interactions between the intent understanding module 200, the output selection module 204, and the output modality selection module 210 with the WOZ intervention reasoner 214, the conversation assignment module 216, and the WOZ intervention feedback module 218. To this end, the WOZ gate 212 is coupled to the intent understanding module 200, the output selection module 204, the output modality selection module 210, and the WOZ intervention reasoner 214.

The WOZ intervention reasoner 214 is a processor that detects situations that require wizard involvement. Methods for detecting these situations are discussed in greater detail below. In one embodiment, these methods rely on at least one of: dialogue uncertainty and machine learning using data from past situations. The WOZ intervention reasoner 214 is coupled to the WOZ gate 212, as discussed above, and uses information provided by the WOZ gate 212 to detect these situations. Specifically, the WOZ gate 212 determines whether wizard intervention is required based on the outputs of the intent understanding module 200 and the output selection module 204, which are forwarded by the WOZ gate 212 (e.g., has the user intent been correctly interpreted and has an appropriate system output been selected?). In addition, the WOZ intervention reasoner 214 is coupled to the conversation assignment module 216 and the WOZ intervention feedback module 218 and invokes these components when a situation is detected in which wizard intervention is required.

The conversation assignment module 216 assigns conversations (e.g., user interactions with the system 100) to particular wizards based on instructions from the WOZ intervention reasoner 214. Specifically, when the WOZ intervention reasoner 214 detects that wizard involvement is required in a conversation, it instructs the conversation assignment module 216 to assign the conversation to an appropriate wizard. Thus, the conversation assignment module 216 also communicates with the wizards and receives feedback from the wizards regarding the behavior of the system 100. The conversation assignment module 216 forwards this feedback back to the WOZ intervention reasoner 214.

The WOZ intervention feedback module 218 is coupled to the WOZ intervention reasoner 214, as discussed above, and receives wizard feedback from the WOZ intervention reasoner 214, which, in turn, receives the wizard feedback from the conversation assignment module 216 as discussed above). The WOZ intervention feedback module 218 uses this feedback to adjust the first and second learned models 202 and 206. By adjusting the first and second learned models 202 and 206, which are accessed by the intent understanding module 200 and the output selection module 204, respectively, the behavior of the system 100 with respect to user interactions can be adapted.

Figure 3:
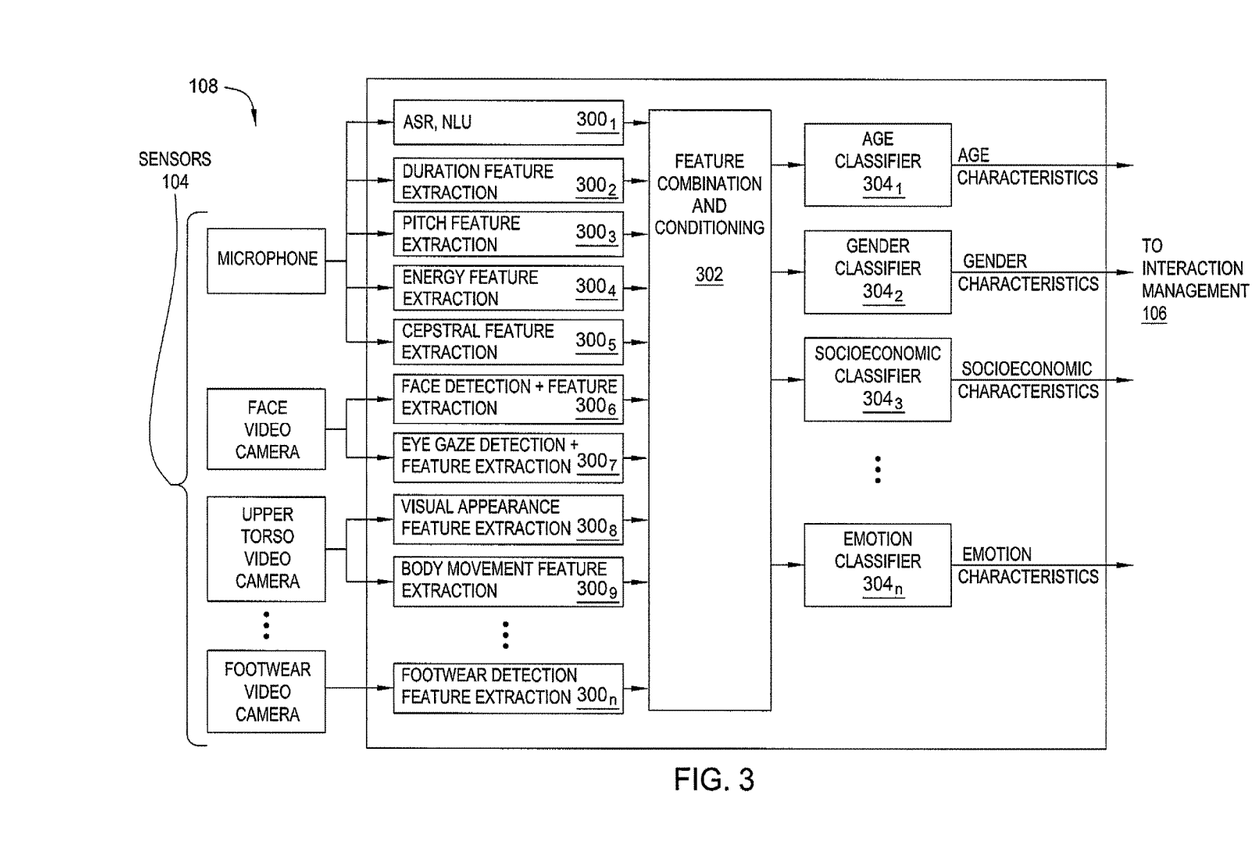
FIG. 3 is a schematic diagram illustrating one embodiment of the user characteristics and affective state computation module of FIG. 1 in more detail.

FIG. 3 is a schematic diagram illustrating one embodiment of the user characteristics and affective state computation module 108 of FIG. 1 in more detail. As illustrated, the user characteristics and affective state computation module 108 generally comprises a plurality of feature extractors $300_1$-$300_n$ (hereinafter collectively referred to as "feature extractors 300"), a feature combination and conditioning module 302, and a plurality of classifiers $304_1$-$304_n$ (hereinafter collectively referred to as "classifiers 304").

The feature extractors 300 are processors that extract features from sensed data provided as inputs by the sensors 104. FIG. 3 illustrates a plurality of exemplary sensors and corresponding feature extractors 300 to which the sensors may provide sensed data. For instance, the sensors 104 may include a microphone, a video camera focused on the user's face, a video camera focused on the user's upper torso, and a video camera focused on the user's footwear, among other sensors. The microphone may provide sensed data to feature extractors 300 including of at least one of: an automatic speech recognition and natural language understanding processor $300_1$, a duration feature extractor $300_2$, pitch feature extractor $300_3$, an energy feature extractor $300_4$, and a cepstral feature extractor $300_5$. The video camera focused on the user's face may provide sensed data to feature extractors 300 including of at least one of: a face detection and feature extractor $300_6$ and eye gaze detection and feature extractor $300_7$. The video camera focused on the user's upper torso may provide sensed data to feature extractors 300 including of at least one of: a visual appearance feature extractor $300_8$ and a body movement feature extractor $300_9$. The video camera focused on the user's upper torso may provide sensed data to feature extractors 300 including at least a footwear detection and feature extractor $300_n$.

The feature combination and conditioning module 302 is a processor that combines and conditions the features that are extracted by the feature extractors. In particular, the feature combination and conditioning module 302 preprocesses the sensed data by combining and/or preparing the sensed data for further processing by the classifiers 304 (e.g., by normalizing the extracted features, reducing noise in the extracted features, or the like).

The classifiers 304 are processors that generate conclusions about the user based on the combined and conditioned features provided by the feature combination and conditioning module 300. FIG. 3 illustrates a plurality of classifiers 304 to which the feature combination and conditioning module 302 may provide combined and conditioned features. For instance, the classifiers 304 may include at least one of the following: an age classifier $304_1$, a gender classifier $304_2$, a socioeconomic classifier $304_3$, and an emotion classifier $304_n$. The age classifier $304_1$ makes a conclusion with respect to the age characteristics of the user, based on the sensed data. The gender classifier $304_2$ makes a conclusion with respect to the gender characteristics of the user, based on the sensed data. The socioeconomic classifier $304_3$ makes a conclusion with respect to the socioeconomic status characteristics of the user, based on the sensed data. The emotion classifier $304_n$ makes a conclusion with respect to the current emotional characteristics or affective state of the user, based on the sensed data. All of these characteristics are output by their respective classifiers 304 to the interaction management module 306, as discussed above.

The system 100, configured as illustrated in FIGS. 1-3, gives the wizards access to the internal decisions made by the system 100, which contribute to the final output of the system 100. For example, as illustrated in FIG. 2, the wizards have access to at least the outputs of the intent understanding module 200 (which determines the intent or goal of a user request) and the output selection module 204 (which determines how to respond to the user's intent or goal), as well as to the final system output. This allows the wizards to provide the system 100 with more targeted feedback. This is beneficial because if one of the internal decisions of the system 100 is incorrect (e.g., the user's intent is misinterpreted), then this incorrect decision can propagate through the system and cause other incorrect decisions to be made. Thus, although the system's components may be operating properly with respect to their respective inputs, the system's final output quality may be poor.

For example, in the navigation context, the user may provide the system 100 with the spoke command "Give me directions to Bart's house." If the command is misinterpreted as "Give me directions to Mark's house," then the system 100's output might be "Turn right ahead." However, if a wizard has access to the system's internal decisions (such as interpretation of user intent), he or she could correct those internal decisions (e.g., correct "Mark" to "Bart"). Thus, the system's output might be changed to "Go straight" based on this correction. In this manner, the system 100 can continue processing the user's request, and the feedback from the wizard can be exploited to improve, for example, the name models used by the intent understanding module 200.

Additionally, if a wizard corrects an internal decision made by the system 100 early in the reasoning pipeline, a correction at that early point may allow a correct output to be generated when the correction propagates through the rest of the system 100. This will likely be more efficient than having the wizard correct the final output, because choosing a correct decision from a list of small possibilities early on will likely be faster than generating a full response to the user of than choosing a correct decision from a large list of canned responses. For instance, in the above example, simply changing "Mark" to "Bart" and allowing the system 100 to look up the correct navigation action is more efficient than having the wizard look up the directions.

Given this targeted feedback, some components of the system 100 may be able to support online learning, which is a mechanism that supports continuous improvement of models. Specifically, the models used to generate decisions (e.g., the first and second sets of learned models 202 and 206 illustrated in FIG. 2) can be updated after each piece of feedback from the wizards. As each component of the system 100 improves its behavior, the overall accuracy of the system 100 will likewise improve, and fewer interventions by the wizards will be necessary. For instance, in the example above, the automatic speech recognition and natural language understanding processor $300_1$ illustrated in FIG. 3 may change it internal models to prefer "Bart" over "Mark" in ambiguous cases.

Figure 4:
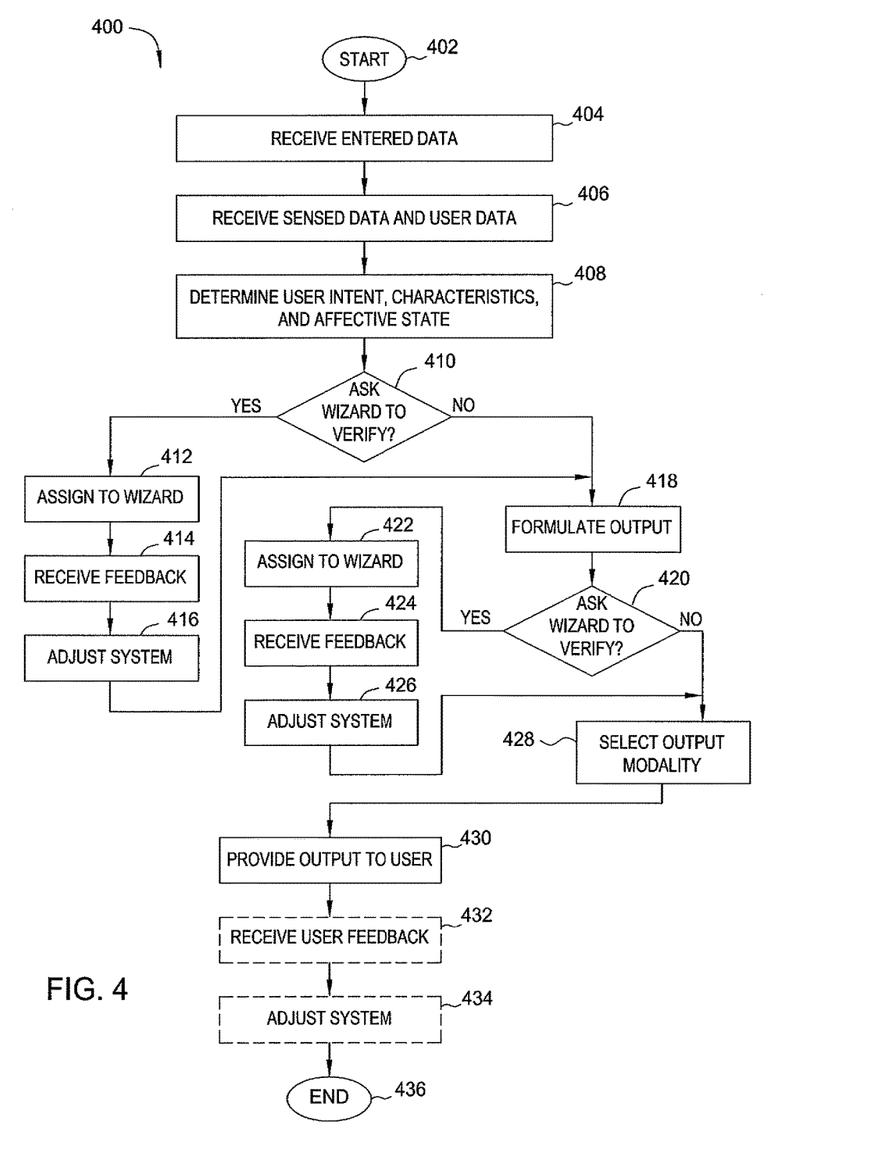
FIG. 4 is a flow diagram illustrating one embodiment of a method for responding to a user request, according to the present invention.

FIG. 4 is a flow diagram illustrating one embodiment of a method 400 for responding to a user request, according to the present invention. The method may be implemented, for example, by the intelligent assistant system 100 illustrated in FIGS. 1-3. As such, reference is made in the discussion of the method 400 to various elements of FIGS. 1-3. It will be appreciated, however, that the method 400 is not limited to implementation with the specific configuration illustrated in FIGS. 1-3, and may, in fact, be implemented with intelligent assistant systems having alternative configurations.

The method 400 is initialized at step 402 and proceeds to step 404, where the system 100 receives (via the input device 102) entered data that is entered by the user. In one embodiment, entered data comprises a user request for specific information (e.g., "Give me directions to Bart's house").

In step 406, the system 100 also receives (via the sensors 104 and the input device 102, respectively) sensed data and user data. As discussed above, the sensed data comprises data from which the user's characteristics and/or affective state can be inferred (e.g., the user's appearance or movements), while the user data comprises stored data about the user, (e.g., user preferences).

In step 408, the intent understanding module 200 of the interaction management module 106 determines the user's intent from the entered data. For example, if the entered data was the voice command, "Give me directions to Bart's house," the intent understanding module 200 should determine that the user's intent is to acquire directions to Bart's house. As discussed above, this step may include various processing steps that operate on the entered data and may invoke various models, depending on the form in which the entered data was received (e.g., NLU, ASR, OCR, or the like). In addition, in step 408, the user characteristics and affective state computation module determines the user's current characteristics (e.g., the user is an adult male) and affective state (e.g., the user appears to be in a hurry). As discussed above, this step may include various processing steps that operate on the sensed data, depending on the form in which the sensed data was received (e.g., feature extraction and classification).

In step 410, the WOZ intervention reasoner 214 of the interaction management module 106 determines whether a wizard should be consulted to verify the conclusions reached in step 408. For instance, the WOZ intervention reasoner 214 may determine that the intent understanding module's conclusions as to the user's intent should be questioned. Various specific methods for detecting when a wizard should be consulted are discussed in greater detail below.

If the WOZ intervention reasoner 214 concludes in step 410 that a wizard should be consulted, then the method 400 proceeds to step 412, and the conversation assignment module 216 of the interaction management module 106 assigns the current interaction to a wizard. In one embodiment, a wizard may be selected based on a particular field of expertise relevant to the present interaction (e.g., navigation) or present step of the present interaction (e.g., natural language understanding.

In step 414, the conversation assignment module 216 receives feedback from the wizard to whom the interaction was assigned. The feedback may confirm the conclusions of the intent understanding module 200, or the feedback may include corrections to the conclusions (e.g., "Bart" was misrecognized as "Mark").

In step 416, the WOZ intervention feedback module 218 of the interaction management module 106 adjusts the system in accordance with the feedback received in step 414. For example, the WOZ intervention feedback module 218 may adjust the first or second set of learned models 202 or 206 to better understand user intent (e.g., when the intent is ambiguous from the entered data, choose "Bart" over "Mark").

In step 418, the output selection module 204 of the interaction management system 106 formulates an output responsive to the entered data received in step 404 (e.g., directions to Bart's house). In one embodiment, an appropriate output is not only responsive to the entered data, but also accounts for the user's preferences (e.g., as embodied in the user data) and/or characteristics and affective state (e.g., as inferred by the user characteristics and affective state computation module 108).

If the WOZ intervention reasoner 214 concludes in step 410 that a wizard should not be consulted (i.e., the intent understanding module's conclusions are assumed to be correct), then the method 400 proceeds directly to step 418 and bypasses steps 412-416.

Once the output has been formulated, the WOZ intervention reasoner 214 again determines in step 420 whether a wizard should be consulted to verify the conclusions reached in step 418. For instance, the WOZ intervention reasoner 214 may determine that the output selection module's conclusions as to the appropriate output should be questioned.

If the WOZ intervention reasoner 214 concludes in step 420 that a wizard should be consulted, then the method 400 proceeds to step 422, and the conversation assignment module 216 of the interaction management module 106 assigns the current interaction to a wizard.

In step 424, the conversation assignment module 216 receives feedback from the wizard to whom the interaction was assigned. The feedback may confirm the conclusions of the output selection module 204, or the feedback may include corrections to the conclusions (e.g., the user is approximately 10 years older than the user characteristics indicate).

In step 426, the WOZ intervention feedback module 218 of the interaction management module 106 adjusts the system in accordance with the feedback received in step 424. For example, the WOZ intervention feedback module 218 may adjust the first or second set of learned models 202 or 206 to better infer the user characteristics (e.g., when the user age is ambiguous from the sensed data, assume the user is older).

In step 428, the output modality selection module 210 of the interaction management system 106 selects a modality for the system output (e.g., audio). In one embodiment, an appropriate output modality accounts for the user's preferences (e.g., as embodied in the user data) and/or characteristics and affective state (e.g., as inferred by the user characteristics and affective state computation module 108). For instance, an audio modality may be preferable when the user appears to be in a hurry and may not have time to read the output off of a display. Alternatively the user's preference may state that audio output is preferred over other modalities.

If the WOZ intervention reasoner 214 concludes in step 420 that a wizard should not be consulted (i.e., the output selection module's conclusions are assumed to be correct), then the method 400 proceeds directly to step 428 and bypasses steps 422-426.

Once the output modality has been selected, the output device 110 provides the system output to the user, via the selected output modality.

In optional step 432 (illustrated in phantom), the system 100 receives (e.g., via the input device 102) user feedback responsive to the system output. The user feedback may indicate, for example, that the system output was correct and/or appropriate. Alternatively, the user feedback may indicate corrections to the system output and/or the conclusions that produced the system output (e.g., "This isn't Bart's house").

In optional step 434 (illustrated in phantom), the system 100 adjusts itself in response to the user feedback. For example, the system 100 may adjust the first or second set of learned models 202 or 206 based on the user feedback, just as the first and second set of learned models 202 and 206 may be adjusted based on wizard feedback. Thus, user feedback may also be used to improve the behavior of the system 100.

The method 400 terminates in step 436.

As discussed above, in order for the wizards to be able to provide feedback at the appropriate times, the system 100 (e.g., specifically, the WOZ intervention reasoner 214) must be able to detect situations that require wizard intervention. This problem can be stated as follows: given some situation (a point in the interaction between the user and the system 100), and given a wizard intervention point, the system 100 must choose between "Ask a wizard" and "Assume the system is correct" (e.g., steps 410 and 420 of the method 400). There are several ways in which this decision can be made.

In one embodiment, this determination is based at least in part on dialogue uncertainty. Most statistical approaches to natural language understanding output a distribution over possible understandings, rather than a single best understanding. The shape of this distribution can be used to infer a level of uncertainty ascribable to the system 100. Intuitively, the greater the uncertainty, the more probable the need for wizard intervention.

In one embodiment, the method 400 (e.g., steps 410 and 420) incorporates a threshold by which the most probable item in a distribution will be accepted without consulting a wizard. This threshold defines the minimum distance required between the probabilities of the best and second best item in the distribution. For example, if the best item has a probability of 0.6, and the second best item has a probability of 0.35, then the difference of 0.25 may not be large enough to classify the system 100 as "sure" that the best item is good enough to accept. On the other hand, if the best item has a probability of 0.55, and the second best item has a probability of 0.01, then the best item may be accepted without consulting a wizard. In one embodiment, the threshold is adjustable and may be defined by the user.

In an alternative embodiment, the posterior probability of the best item is computed. This approach may also allow inclusion of prior information in the decision making process, since the posterior probabilities are self-normalizing.

In the case of speech input (e.g., the entered data is a spoken command), a richer level of representation of the recognized speech (using multiple hypotheses with their own confidences) allows the method 400 to derive probabilities for understanding categories of each hypotheses. The distribution of probabilities of the understanding categories can then be probabilistically combined to arrive at a more robust distribution that is representative of the multiple recognition hypotheses.

In another embodiment, the determination as to whether to consult a wizard is based at least in part on machine learning using data from past situations. Over time, a wizard will intervene in many situations. In some situations, the wizard will override the system's choices; in other situations, the wizard will accept the system's choices.

By extracting features of each situation and using labels such as "ask wizard" and "assume system is correct," a straightforward supervised learning problem can be developed that will induce a model that outputs either "ask wizard" or "assume system is correct." Using many classes of learning algorithms, the output is not a simple, discrete answer; instead, a confidence is attached to each label. In one embodiment, a threshold is established such that "ask wizard" is always chosen if the confidence level for a label is below the threshold. The models can obtain data from other dialogue and user-specific features (and associated confidences), such as previous system outputs, previous system decisions, and the like.

In yet another embodiment, a combination of dialogue uncertainty and machine learning is used to determine when to consult a wizard. Both of the previous approaches define confidence thresholds below which the wizard must be consulted. In another embodiment, a what-if analysis is performed on the x best items even when the thresholds are not met. If both items lead to the same result, then there is no need to consult a wizard (except to elicit feedback for learning).

Even assuming that the system can accurately detect the need for wizard intervention, the system must also be able to quickly deliver the context of the interaction to the wizard. A user may grow dissatisfied if the system takes a long time to generate an output (e.g., because it must wait for wizard feedback). Thus, embodiments of the invention employ techniques that seek to make delays resulting from wizard consultation more acceptable to the user. In essence, embodiments of the invention "buy time" for the wizard to view transcripts of the interaction and/or play back speech (e.g., with pauses removed and possibly increased audio output).

In one embodiment, a wizard is gracefully introduced into an interaction by giving the wizard only a summary of the interaction or only the last utterance in the interaction. The wizard can then quickly choose a response that will begin to regain the user's trust in the system 100. In this case, the wizard's response may not fully solve the problem, but may at least lead the user to believe that the system 100 is starting to understand. The time required for the user to read the wizard's response and generate a new utterance is spent providing the wizard with the full context of the interaction.

In yet another embodiment, the WOZ intervention reasoner 214 may detect that an interaction is likely to require wizard intervention in the future. Occurrences that may trigger this detection include, for are not limited to: discussion of topics of which the system 100 has limited knowledge, the user frequently changing topics, the user being an important customer, or the user being an individual who has a history of needing help or getting frustrated. When such an occurrence is detected, the WOZ intervention reasoner 214 may notify the conversation assignment module 216 that the current interaction should be monitored by an available wizard. This is another way in which the wizard can be gracefully introduced into the interaction.

In one embodiment, the summary of the interaction is automatically generated using a technique that compares elements of the interaction to elements in the learned models (e.g., first and second sets of learned models 202 and 206).

Words that strongly align with user goals that the system 100 is capable of handling will be highlighted or otherwise indicated. Words that are rare or atypical for the system 100 are also highlighted or otherwise indicated. Together, these summary elements will alert the wizard to the type of interaction being carried out and the elements of the interaction that most likely have given the system 100 trouble.

In another embodiment, the present invention employs stall tactics in which one of a number of canned responses or questions (e.g., "I'm reviewing our conversation to understand better," or "Would you please repeat that?") is provided as output to the user. Such outputs will either lower the perceived response time (e.g., will keep the user mentally busy) or will induce the user to be more accepting of a delay (e.g., by indicating that the system 100 is trying to understand).

In yet another embodiment, a wizard is introduced explicitly to the user (e.g., in a manner similar to introducing a manager in modern call centers). For example, the system 100 can explicitly state to the user "I'm bringing in my manager to help." This creates an expectation of a pause in the interaction (to inform the manager of the context).

Although the present invention may operate with a single wizard, it may be preferable in some cases to employ a plurality of wizards in order to represent particular areas of expertise. Certain contexts may require a higher degree of confidence in the system's output than others. For example, a system that is configured to provide cooking advice is likely to have lower requirements for accuracy than a system that is configured to provide medical advice. For contexts requiring a higher degree of confidence in the system output, the system 100 may combine the recommendations of multiple wizards (each of which may not necessarily be skilled). This avoids the need to consult with expensive experts, but provides a greater degree of confidence in a consensus opinion.

In one embodiment, the multiple responses from multiple wizards are combined using weights that indicate the past performance of the wizards (e.g., how useful or accurate a given wizard's past feedback was, or how often the given wizard's feedback has been consistent with the majority opinion). In one embodiment, incentives are provided to wizards who provide good faith feedback.

Figure 5:
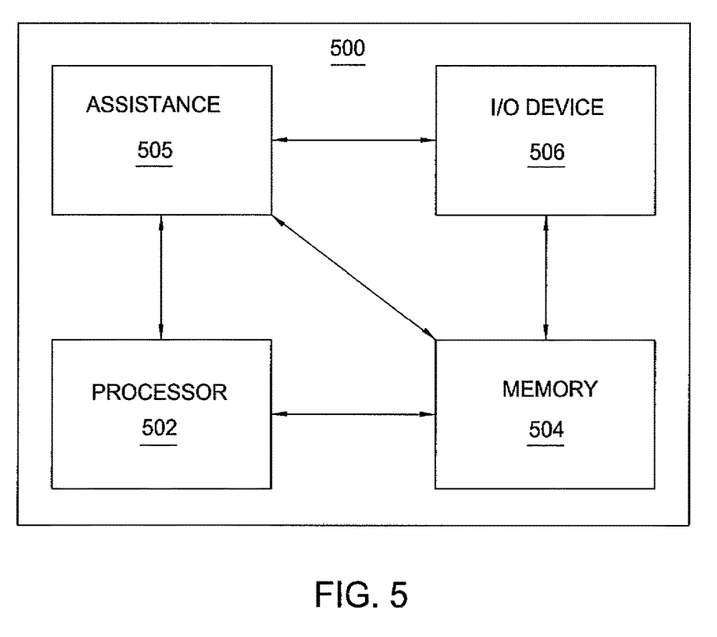
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Moreover, as discussed above, several of the discrete components of the automated intelligent assistant system 100 can be implemented as processors. Therefore, in one embodiment, a general purpose computing device 500 comprises a processor 502, a memory 504, an assistance module 505, and various input/output (I/O) devices 506 such as a display, a keyboard, a mouse, a modem, a microphone, speakers, a touch screen, and the like. In one embodiment, at least one I/O device is a storage device (e.g., a disk drive, an optical disk drive, a floppy disk drive).

Alternatively, embodiments of the present invention (e.g., assistance module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the assistance module 505 for exploiting human feedback in an intelligent automated assistant described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for conducting an interaction between a human user and a device, the method comprising:
   with the device, receiving input indicative of a user request for information;
   with a microphone coupled to the device, receiving sensed data;
   with a feature extraction processor coupled to the microphone, extracting a plurality of speech features from the sensed data;
   with a classifier processor coupled to the feature extraction processor, inferring an affective state of the human user based on the plurality of speech features extracted from the sensed data;
   with an interaction management system coupled to the classifier processor, inferring an intent from the received input by performing one or more of automated speech recognition and natural language understanding using a learned model;
   formulating a proposed response to the received input in accordance with the intent, the proposed response comprising system-generated output;
   determining a measure of certainty associated with one or more of the intent and the proposed response;
   presenting a final response to the received input by an output device of the device when the measure of certainty satisfies a minimum acceptable level of certainty;
   with an interface coupled to the interaction management system between the inferring of the intent and the presenting of the final response, when the measure of certainty does not satisfy the minimum acceptable level of certainty and prior to presenting the final response, communicating the intent and the proposed response and the inferred affective state to a wizard, receiving feedback on the intent and the proposed response and the affective state from the wizard, incorporating the feedback into the final response, updating a model used to generate the proposed response based on the feedback, wherein the wizard is a human person who is not a source of the received input.

2. The method of claim 1, further comprising:
   outputting the final response after adapting the proposed response.

3. The method of claim 1, further comprising:
inferring at least one personal characteristic of the human user; and
formatting the proposed response in accordance with the at least one personal characteristic.

4. The method of claim 3, wherein the at least one personal characteristic is inferred from data that is sensed by one or more sensors.

5. The method of claim 4, wherein the at least one personal characteristic is at least one of:
an age of the human user,
a gender of the human user,
a socioeconomic status of the human user, or
an affective state of the human user.

6. The method of claim 3, wherein the formatting comprises:
selecting a modality for outputting the response in accordance with the at least one personal characteristic.

7. The method of claim 1, further comprising delaying the response until the human person is contacted.

8. The method of claim 7, wherein the delaying comprises:
providing the human person with a summary of the interaction so far;
providing a preliminary response to the human user, based on feedback received from the human person in response to the summary; and
providing the human advisor with a full context of the interaction while the human user is reviewing the preliminary response.

9. The method of claim 8, wherein the providing the human person with the summary comprises:
generating a transcript of the interaction;
comparing the interaction to one or more learned models; and
indicating words in the transcript that are rare or atypical relative to the one or more learned models.

10. The method of claim 7, wherein the delaying comprises:
providing the human user with a canned response; and
providing the human person with a full context of the interaction while the human user is reviewing the canned response.

11. The method of claim 1, wherein the determining comprises:
labeling a plurality of past interactions according to whether each of the plurality of past interactions required a consultation with the human person;
extracting a plurality of features from each of the plurality of past interactions; and
formulating the determining as a supervised learning problem that uses results of the labeling and the extracting as inputs.

12. The method of claim 7, wherein the delaying comprises:
informing the human user that the human person is being consulted; and
providing the human person with a full context of the interaction.

13. The method of claim 11, further comprising:
associating a label with an interaction with the human user indicating whether the interaction with the human user requires a consultation with the human person, based on a result of the supervised learning problem, wherein the label is associated with a confidence; and
requesting the consultation when the confidence fails to meet at least a threshold confidence.

14. The method of claim 1, wherein the receiving comprises:
receiving a plurality of items of feedback from a plurality of human advisors; and
combining the plurality of items of feedback to generate a consensus feedback.

15. The method of claim 14, wherein the combining comprises:
weighting each of the plurality of items of feedback according to a confidence indicating a past performance of an associated human advisor.

16. The method of claim 1, wherein the measure of certainty comprises a statistical measure of dialogue certainty.

17. The method of claim 1, wherein the measure of certainty defines a minimum distance between two probabilities in a distribution.

18. The method of claim 1, wherein the measure of certainty comprises an adjustable threshold value.

19. The method of claim 1, wherein the measure of certainty comprises a posterior probability.

20. The method of claim 1, wherein the measure of certainty is determined based at least in part on machine learning.

21. The method of claim 1, wherein the determining comprises:
producing a distribution comprising a plurality of hypotheses for either the intent or the response;
identifying a best hypothesis and a second best hypothesis among the plurality of hypotheses; and
requesting a consultation when a distance between a confidence in the best hypothesis and a confidence in the second best hypothesis fails to meet at least a threshold distance.

22. The method of claim 2, wherein the determining comprises:
producing a distribution comprising a plurality of hypotheses for either the intent or the response;
identifying a best hypothesis and a second best hypothesis among the plurality of hypotheses;
identifying a result of the best hypothesis and a result of the second best hypothesis; and
requesting a consultation only when the result of the best hypothesis and the result of the second best hypothesis are different.

23. At least one non-transitory computer readable medium containing an executable program for conducting an interaction between a human user and a computing device, where the executable program performs steps comprising:
with a microphone coupled to the computing device, receiving sensed data;
with a feature extraction processor coupled to the microphone, extracting a plurality of features from the sensed data;
with a classifier processor coupled to the feature extraction processor, inferring an affective state of the human user based on the plurality of features extracted from the sensed data;
with an interaction management system coupled to the classifier processor, inferring an intent from a received input by performing one or more of automated speech recognition and natural language understanding using a learned model;
formulating a proposed response in accordance with the intent and the affective state, the proposed response comprising system-generated output;

determining a measure of certainty associated with one or more of the intent and the proposed response;

presenting a final response by an output device of the computing device when the measure of certainty satisfies a minimum acceptable level of certainty;

interposing an interface between the inferring of the intent and the presenting of the final response to, when the measure of certainty does not satisfy the minimum acceptable level of certainty and prior to presenting the final response, communicate the intent and the proposed response to a wizard, receive feedback on the intent and the proposed response from the wizard, incorporate the feedback into the final response, update a model used to generate the proposed response based on the feedback, wherein the wizard is not a source of the received input.

24. A system for conducting an interaction between a human user and a consumer computing device, the system comprising a plurality of processor-executable modules embodied in one or more non-transitory machine readable storage media, the system configured to:

with a microphone coupled to the consumer computing device, receiving sensed data;

with a feature extraction processor coupled to the microphone, extracting a plurality of features from the sensed data;

with a classifier processor coupled to the feature extraction processor, inferring an affective state of the human user based on the plurality of features extracted from the sensed data;

with an interaction management system coupled to the classifier processor, infer an intent from a received input by performing one or more of automated speech recognition and natural language understanding using a learned model;

formulate a proposed response in accordance with the intent and the affective state, the proposed response comprising system-generated output;

determine a measure of certainty associated with one or more of the intent and the proposed response;

present a final response by an output device of the consumer computing device when the measure of certainty satisfies a minimum acceptable level of certainty;

with an interface coupled between the inferring of the intent and the presenting of the final response, when the measure of certainty does not satisfy the minimum acceptable level of certainty and prior to presenting the final response, communicate the intent and the proposed response to a wizard, receive feedback on the intent and the proposed response from the wizard, incorporate the feedback into the final response, update a model used to generate the proposed response based on the feedback, wherein the wizard is not a source of the received input.

* * * * *